(No Model.)
B. E. WAUGAMAN.
ROD COUPLING FOR OIL WELLS.
No. 360,745. Patented Apr. 5, 1887.
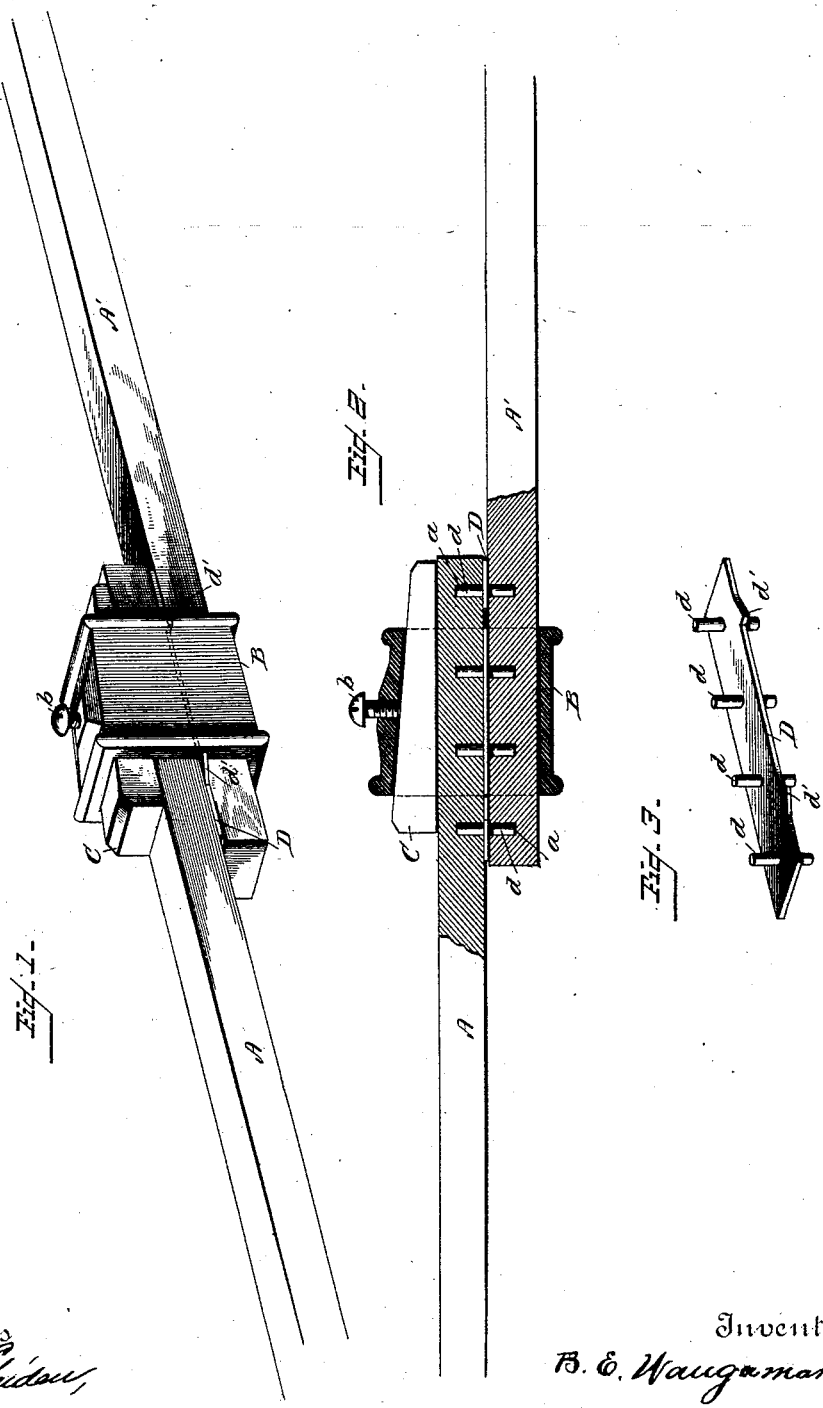

UNITED STATES PATENT OFFICE.

BOAZ E. WAUGAMAN, OF NORTH CLARENDON, PENNSYLVANIA.

ROD-COUPLING FOR OIL-WELLS.

SPECIFICATION forming part of Letters Patent No. 360,745, dated April 5, 1887.

Application filed December 20, 1886. Serial No. 222,091. (No model.)

*To all whom it may concern:*

Be it known that I, BOAZ E. WAUGAMAN, a citizen of the United States, residing at North Clarendon, in the county of Warren and State of Pennsylvania, have invented certain new and useful Improvements in Rod-Couplings for Oil-Well Pumps; and I do hereby declare the following to be a full, clear, and exact description of the invention, such as will enable others skilled in the art to which it appertains to make and use the same.

My invention relates to rod-couplings for coupling or connecting any number of oil or Artesian wells together to pump with one engine or power; and it consists of certain details of construction and arrangement of the several parts, which will hereinafter be more fully described in the specification, and pointed out in the claims.

In the accompanying drawings, illustrating the device, Figure 1 is a perspective view of the coupling; Fig. 2, a longitudinal section of same, and Fig. 3 a detail perspective view of the dowel-plate.

The object of my invention is to present a means for readily coupling the connecting-rods together for any desired distance, and for any number of wells, to be worked by one engine or power; and its advantages are that the rods can be disconnected, taken apart, and connected up again easily and rapidly, and with a saving of about forty per cent. of lumber in the manufacture of the rods.

In the old method, the rods, as well as the couplings, had to be quite heavy, in order to afford timber enough for the bolts and straps to be held securely in place. It is thus evident that the coupling is the weakest point in the rod, and one where the majority of accidents take place; and when once broken or out of order all of the straps and bolts must be replaced.

In my device the coupling is the strongest and stiffest part of the rod. Another advantage in my coupling is that the lightness of the rods saves cost in transportation, not only in railroad-freight, but in the wagon-freight to and from the oil wells or fields. Again, in putting the rods together, two men are enabled to join together from four to six joints with my coupling in the same time that they could put one together in the old way. The rods are made in sections, as long as is convenient to saw them, and are then coupled together after forming a string several thousand feet long; hence will be seen the value of a cheap, durable, convenient, and economical coupling.

As shown in the accompanying drawings, the rods A A' pass through a metal jacket or sleeve, B. Between the two is placed a metal plate, D, having a series of dowel-pins, $d$, projecting outwardly from each side of the plate, as shown in the several figures. The ends of the dowel-plate have small projections $d'$, which engage the edges of the jacket or sleeve B, and thus prevent any slipping forward or backward. The ends of the rods are provided with dowel-openings $a$, corresponding with the dowel-pins on the dowel-plate. The sleeve B is provided at its top with a fastening-screw, $b$, which engages or presses against the wedge C.

The operation of the device is as follows: In order to couple up two rods, the dowel-plate is inserted sidewise through the jacket and then turned flat, so that the projection $b'$ may engage with the ends of the sleeve. One end of a rod is then inserted until its dowel-holes engage the pins D. The end of the next rod is then inserted and its dowel-holes made to correspond with the dowel-pins in the same way. Next the key C is driven in, as shown, and the set-screw $b$ then screwed down until it engages with said sleeve. It will thus be seen that it is impossible for the rods to have any movement within the jacket; and it will also be seen that at this connecting-point the parts are very strong and the possibilities of breaking are reduced to a minimum. As a matter of fact, the rods will break at almost any other point than their connecting-point. It will also be seen that any number of these rods can be used, and the operation of joining them together is quickly and economically done.

Having thus described my invention, what I claim, and desire to secure by Letters Patent, is—

1. In a rod-coupling for oil-well pumps, the combination, with the rod-sections having dowel-openings, of an interposed dowel-plate and a sleeve or jacket inclosing the ends of the rods, substantially as and for the purpose set forth.

2. In a rod-coupling for oil-well pumps, the combination, with the rods having dowel-openings in their ends and an inclosing-sleeve, of a dowel-plate adapted to be placed between said ends and having dowel-pins on each side thereof to enter said dowel-openings, and projections adapted to engage the ends of a sleeve or jacket inclosing said rod ends, substantially as and for the purpose set forth.

3. In a rod-coupling for oil-well pumps, the combination, with the rods having dowel-openings, of an interposed dowel-plate, an inclosing-jacket or sleeve, and a key interposed between one of the rods and the side of the jacket, substantially as and for the purpose set forth.

In testimony whereof I affix my signature in presence of two witnesses.

BOAZ E. WAUGAMAN.

Witnesses:
JOHN SPARKS,
M. S. BOOTH.